(12) United States Patent
Stern et al.

(10) Patent No.: US 9,092,270 B2
(45) Date of Patent: Jul. 28, 2015

(54) METHOD OF SOA PERFORMANCE TUNING

(71) Applicant: Oracle International Corporation, Redwood Shores, CA (US)

(72) Inventors: Bo Stern, Mountain View, CA (US); Dmitry Kocherginsky, Brighton East (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 374 days.

(21) Appl. No.: 13/626,818

(22) Filed: Sep. 25, 2012

(65) Prior Publication Data

US 2014/0089928 A1    Mar. 27, 2014

(51) Int. Cl.
  *G06F 9/46*    (2006.01)
  *G06F 9/50*    (2006.01)
  *G06F 11/34*   (2006.01)

(52) U.S. Cl.
  CPC .............. *G06F 9/5083* (2013.01); *G06F 11/34* (2013.01)

(58) Field of Classification Search
  None
  See application file for complete search history.

(56) References Cited

U.S. PATENT DOCUMENTS

| | | | |
|---|---|---|---|
| 6,128,642 A * | 10/2000 | Doraswamy et al. | 709/201 |
| 6,477,561 B1 * | 11/2002 | Robsman | 718/105 |
| 6,986,139 B1 * | 1/2006 | Kubo | 718/105 |
| 7,137,120 B2 * | 11/2006 | Armstrong et al. | 718/107 |
| 7,207,043 B2 | 4/2007 | Blythe et al. | |
| 7,237,242 B2 * | 6/2007 | Blythe et al. | 718/105 |
| 7,509,646 B1 * | 3/2009 | Maw et al. | 718/105 |
| 7,827,535 B2 | 11/2010 | Maron | |
| 8,219,999 B2 * | 7/2012 | Raspl et al. | 718/105 |
| 8,234,652 B2 * | 7/2012 | Arimilli et al. | 718/105 |
| 8,522,241 B1 * | 8/2013 | Vohra et al. | 718/100 |
| 2004/0059956 A1 * | 3/2004 | Chakravarthy et al. | 713/600 |
| 2008/0033900 A1 * | 2/2008 | Zhang et al. | 706/52 |
| 2010/0037038 A1 * | 2/2010 | Bieswanger et al. | 712/220 |
| 2012/0130680 A1 * | 5/2012 | Zink et al. | 702/186 |

* cited by examiner

*Primary Examiner* — Lewis A Bullock, Jr.
*Assistant Examiner* — Bruce S Ashley
(74) *Attorney, Agent, or Firm* — Kilpatrick Townsend & Stockton LLP

(57) ABSTRACT

Systems and methods of SOA performance tuning are provided. In accordance with an embodiment, one such method can comprise monitoring a plurality of processing stages, calculating a processing speed for each of the processing stages, and tuning a slowest processing stage of the plurality of processing stages.

20 Claims, 7 Drawing Sheets

METHOD OF SOA PERFORMANCE TUNING

BACKGROUND OF THE INVENTION

Embodiments of the present invention relate generally to methods and systems for service oriented architecture (SOA) performance tuning and more particularly to automatically improving thread pool performance.

Performance tuning of computer systems which comprise various processing modules or stages has traditionally involved manual trial and error attempts, often without a strategy of which modules or stages should be tuned. As a result, performance improvements were limited and required near constant adjustment. One example of performance tuning is in database connection pools. An administrator can set a minimum connections parameter and a maximum connections parameter, and the actual number of connections can then vary between these values. However, the preset minimum and maximum connections, if set incorrectly, can lead to performance bottlenecks or frequent crashes. As such, the administrator must manually adjust the parameters in an attempt to correct and/or avoid these problems. It is left to the administrator's judgment to analyze the system to determine which parameter to adjust and by how much.

BRIEF SUMMARY OF THE INVENTION

Embodiments of the invention pertain to methods and systems for performance tuning of processing modules or stages which are self-correcting and which can improve performance automatically without regular manual administrator inputs. In accordance with an embodiment, one such method can comprise monitoring a plurality of processing stages, calculating a processing speed for each of the processing stages, and tuning a slowest processing stage of the plurality of processing stages. This method can further include analyzing a SOA process to identify the plurality of processing stages.

In some embodiments, monitoring a plurality of processing stages can comprise determining a thread rate for each processing stage, and determining a number of threads enabled for each processing stage. The thread rate is a number of messages which can be processed by a thread in a specified time period. Additionally, calculating a processing speed for each of the processing stages can comprise multiplying the thread rate by the number of threads enabled for each processing stage to determine the processing speed for each processing stage.

In some embodiments, tuning a slowest processing stage of the plurality of processing stages can comprise calculating a new number of threads to be allocated to the slowest processing stage, and allocating the new number of threads to the slowest processing stage. Additionally, calculating a new number of threads to be allocated to the slowest processing stage can comprise dividing the processing speed for a fastest processing stage by the thread rate for the slowest processing stage.

In some embodiments, tuning can include throttling the performance of a particular stage. This can include monitoring a plurality of queues associated with different processing stages, and if a particular queue includes a number of messages greater than a threshold, then reducing a number of threads allocated to a first processing stage in the plurality of processing stages. Additionally, a number of threads allocated to a particular processing stage associated with the particular queue can be increased.

DETAILED DESCRIPTION OF THE INVENTION

Figure 1:
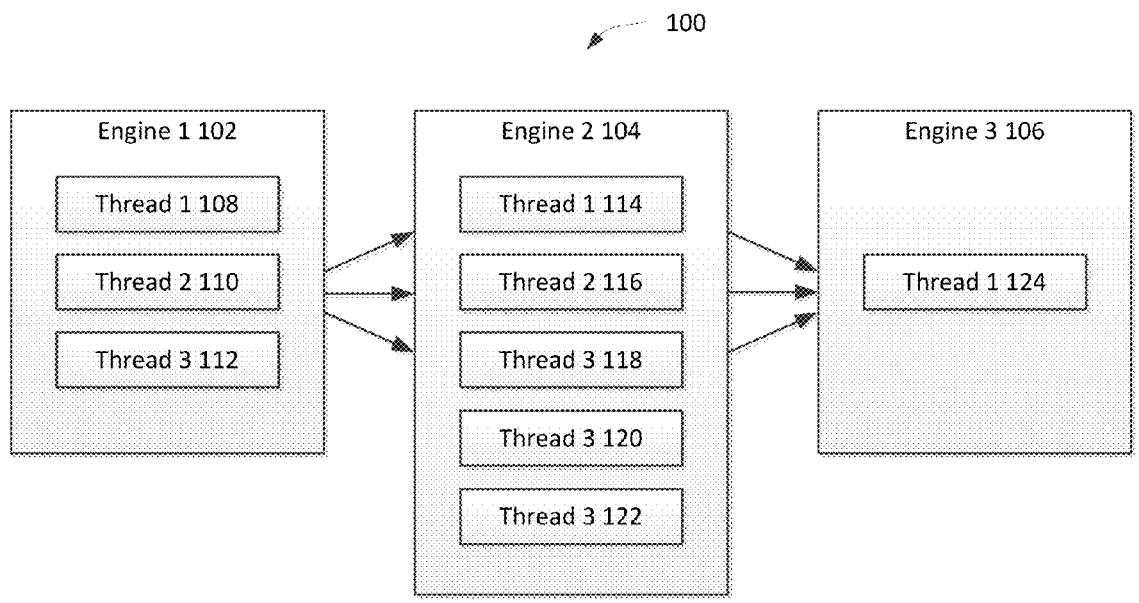
FIG. 1 shows an example of sequential processing, in accordance with an embodiment of the present invention.

In the following description, for the purposes of explanation, specific details are set forth in order to provide a thorough understanding of embodiments of the invention. However, it will be apparent that the invention embodiments may be practiced without these specific details.

Previously, as described above, tuning of both sequential and parallel processing systems was performed manually, typically by trial and error with no clear strategy as to which particular engine should be tuned or how it should be tuned. As a result, improvements due to tuning were often less than optimal and required substantial efforts to manually monitor and adjust. Typical adjustments can be made to one or more thread pools associated with each engine, such as changing a maximum number of threads available to an engine. For example, database connection pools allow an administrator to set minimum and maximum connection parameters for the connection pool. The actual size of the pool can then fluctuate between the minimum and maximum connections at any given time. However, the max connections parameter has to be set manually by the administrator in advance. If set too low it might result in an application waiting for the database connections, and if set too high it might lead to frequent database crashes. In a SOA context, these performance problems can manifest as a crash due to a lack of available memory.

As such, manual performance tuning can lead to a number of different problems, including: suboptimal performance due to no coordination between different thread pools for different engines; crashes due to not enough resources on one part of the system; and clogging of the system by large messages. Manual performance tuning also requires a longer time to perform and cannot respond as quickly to changing system conditions. Although embodiments discussed herein make reference to SOA systems in particular, the systems and methods disclosed herein are equally applicable to automatic performance tuning of any server system which can be divided into multiple processing stages utilizing at least two thread pools. A server may be a Java server or database server or any type of hardware and/or software device, which has multiple threads of execution.

In accordance with an embodiment, service oriented architecture (SOA) processes can be divided into individual stages with delineated engine boundaries. Once the process is so divided, different types of processes can be analyzed to determine how these different types of processes can be tuned to improve processing performance. For example, in a linear, sequential process, the rate of processing is determined by the slowest engine (also referred to herein as a stage or processing stage); whereas in a parallel process, the rate of processing is determined by the fastest stage. Based on these analyses, system and methods for improving SOA performance can be utilized.

In accordance with an embodiment, a method of automatic performance tuning can comprise collecting performance information for each processing stage, determining a slowest processing stage and tuning the slowest processing stage. The performance information can include a number of threads allocated for a particular processing stage, and how long each stage takes to process a message. Collecting performance information for each processing stage can include monitoring thread pools associated with the processing stages to determine how many threads are available to that processing stage, and monitoring message processing times for each stage in the SOA process. The processing rate represents how quickly that processing stage can process one message. The performance information can also include an ideal rate, which represents the time taken to process a message by a particular stage under no stress conditions, and a number of threads currently being utilized for each stage.

The processing speed of each stage can then be determined by multiplying the number of threads running for each stage by the processing rate at each stage. The slowest stage can then be determined by finding the stage with the slowest processing speed. Once the slowest stage is identified, the slowest stage can be tuned by adjusting the number of threads available to that stage. For example, the number of threads available to the slowest stage can be increased according to the following equation:

$$New\_Number\_threads = [rate(fastest)*number\_of\_threads]/rate(slowset)$$

The New_Number_threads parameter can represent a new number of threads allocated to the thread pool associated with the slowest stage. Rate (fastest) and rate (slowest) represent the current processing speed for the fastest and slowest processing stages, respectively. The number_of_threads represents the number of threads currently allocated to the thread pool associated with the slowest stage. Thus, according to this equation, the thread pool associated with the slowest processing stage will be expanded by a number of threads equal to the New_Number_threads minus the number_of_threads. This should increase the processing speed of the slowest stage to be approximately the same as the processing speed of the fastest stage. This process can be repeated for each stage, as needed.

Similarly, fast processing stages can be throttled to achieve a stable equilibrium within the process. After the performance information of each stage is collected, information about the resources available on each stage can be evaluated. For example, each stage can include a message queue which holds messages until threads becomes available to process the messages. If the queue exceeds a certain size, then a fast processing stage earlier in the process can be throttled (e.g., have the number of threads available in its thread pool reduced) until the queue has reduced in size.

As described above, computer system processes can include both sequential and parallel processes. One example of sequential processing is an integration scenario where, e.g., an adapter receives a message and passes the message to a mediator, which then passes the message to another process, such as a BPEL process. Parallel processing occurs when requests are, for example, load balanced between different servers. In case of integration tools, different engines would typically process messages in sequence while each engine taken in isolation would run multiple threads in parallel. Each type of process is discussed in greater detail below.

FIG. 1 shows an example of sequential processing, in accordance with an embodiment of the present invention. As shown in FIG. 1, an exemplary process 100 can include three engines: Engine 1 102, Engine 2 104 and Engine 3 106. Each engine can represent a different, distinct processing stage, such as different services in a SOA suite. Processing proceeds linearly from Engine 1 102 to Engine 2 104 and finally to Engine 3 106. Within each engine, multiple threads can be run in parallel. For example, Engine 1 102 includes Threads 108-112, Engine 2 104 includes Threads 114-122, and Engine 3 106 includes a single Thread 124.

In accordance with an embodiment, for each engine taken separately, a maximum processing rate can be determined by the following equation:

$$Engine\_rate(max) = Thread\_rate*Number\_of\_threads$$

In this equation, the Thread_rate represents a number of messages processed by one thread per second. Engine rate generally refers to a number of messages per second which can be processed by an engine. Here, the Engine_rate(max) represents a maximum engine rate where each thread in a particular engine is processing messages, without any free or waiting threads; and the Number_of_threads represents how many threads are available to the engine.

Under stable flow conditions, in a sequential process, the number of messages processed at each stage is expected to be approximately equal. At the same time, the rate of message processing in sequential processing is limited by the slowest stage. For the slowest stage the following relationship is expected to hold:

$$Engine\_rate(actual) = Engine\_rate(max) = Thread\_rate*Number\_of\_threads.$$

In accordance with an embodiment, for the slowest stage, the Engine_Rate (actual) can equal the Engine_rate (max). However, for other stages Engine_Rate (actual) can be less than the Engine_rate (max). For those stages some threads may be either idle or waiting.

Figure 2:
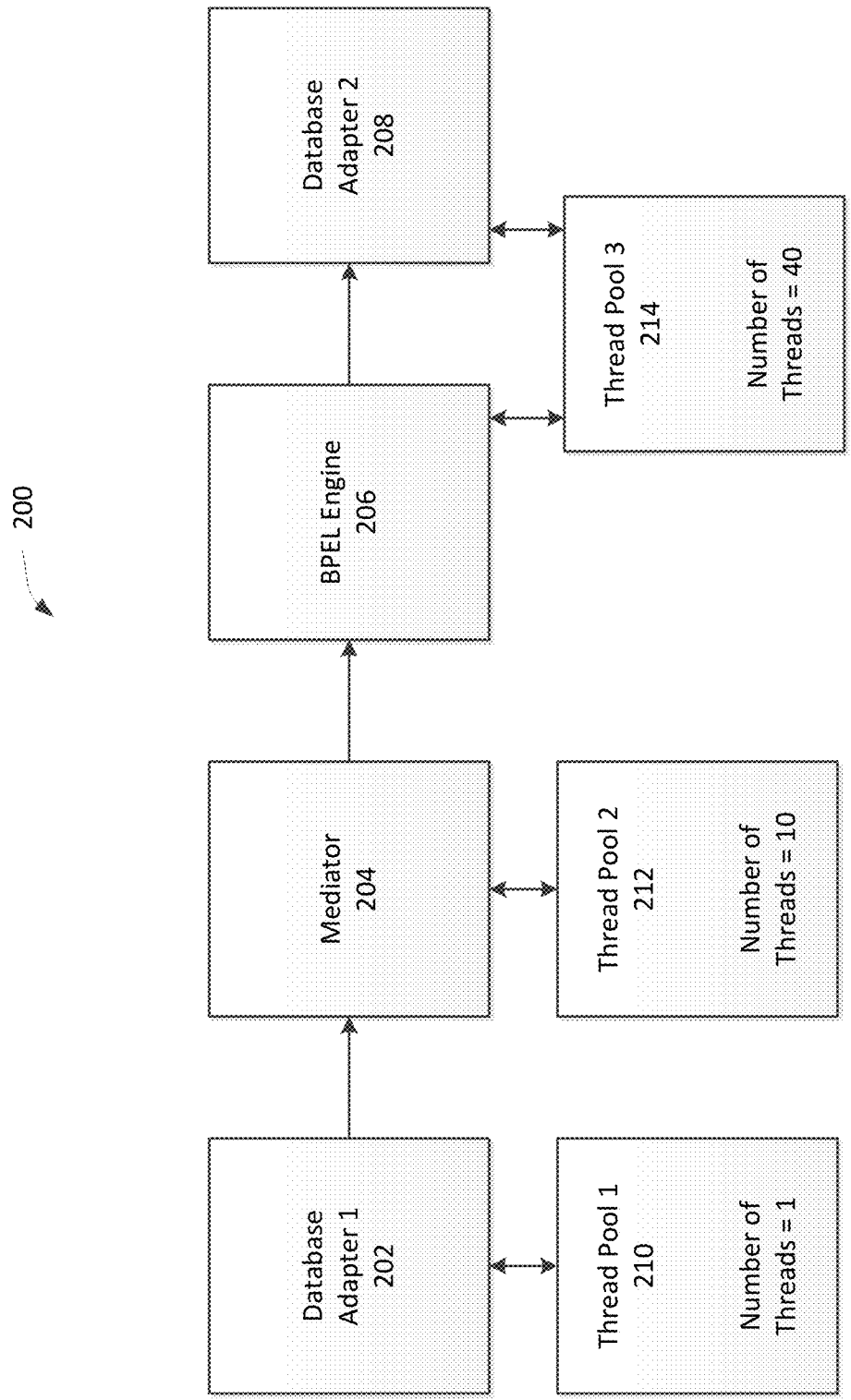
FIG. 2 shows an example of sequential processing, in accordance with an embodiment of the present invention.

FIG. 2 shows an example of sequential processing, in accordance with an embodiment of the present invention. As shown in FIG. 2, a process 200 includes four processing stages: a first database adapter 202 (database_adapter_1), a mediator 204, a BPEL engine 206, and a second database adapter 208 (database_adapter_2). An automatic tuning module can monitor performance information related to the process and tune stages as needed to improve performance. Performance information for each stage can be collected using an audit trail of one message through the process. For example, the audit trail may indicate that the message took one second to be processed by the first database adapter 202, one second to be processed by the mediator 204, two seconds to be processed by the BPEL engine 206 and one second to be processed by the second database adapter 208. The processing speed for each stage will depend on how many threads are allocated to each stage. Each stage can be associated with a thread pool, and each thread pool can have a parameter which determines a maximum number of threads available from that thread pool.

For example, as shown in FIG. 2, the first database adapter 202 is associated with thread pool 210, which has a maximum number of threads set to one. Thus the processing speed for the first database adapter is one message per second. Mediator 204 is associated with thread pool 212, which has a maximum of ten threads enabled, so it has a processing speed of 10 messages per second. Thread pool 214, associated with BPEL engine 208, has a maximum of forty threads enabled, making the BPEL engine's processing speed twenty messages per second. In accordance with an embodiment, stages can have a dedicated thread pool or can share a thread pool with another stage. For example, as shown in FIG. 2, the first database adapter 202 may run in its own thread while the second database adapter 208 may run in a thread from thread pool 214 which is also associated with BPEL engine 206. Based on the processing speeds of the stages in process 200, the first database adapter 202 can be identified as the slowest, and therefore, limiting stage of process 200.

In this particular case, increasing the maximum number of threads in thread pool 210, associated with the first database adapter 202, should have a significant effect on performance, while tuning of either thread pool associated with the mediator or the BPEL engine will have little to no effect because message processing is not limited by those stages. A new number of threads can be calculated according to the following equation which was described above with respect to FIG. 1:

$$\text{New\_Number\_threads}=[\text{rate(fastest)}*\text{number\_of\_threads})]/\text{rate(slowset)}.$$

As described above, the fastest stage is the BPEL engine at twenty messages per second. The current number of threads allocated to the first database adapter is one and its processing rate is one message per second. Accordingly, the new number of threads which should be allocated to the first database adapter is twenty. This should make the processing speed of the first database adapter approximately equal to the processing speed of the BPEL engine.

Monitoring and tuning of the process can continue by the automatic tuning module after making an adjustment to the first database adapter. However, continuously making adjustments can lead to processing instabilities. For example, the automatic tuning module may be responding to transient changes in processing speed caused by previous adjustments which may not reflect the performance of the process at steady-state. Accordingly, a pause time (e.g., a cool-down period) can be set which prevents the automatic tuning module from making adjustments for a predefined period of time after an adjustment has been made. Alternatively, or additionally, the automatic tuning module can collect performance information over a period of time and average the performance information. This can smooth transient changes in performance and prevent over-adjustments to transient changes.

Figure 3:
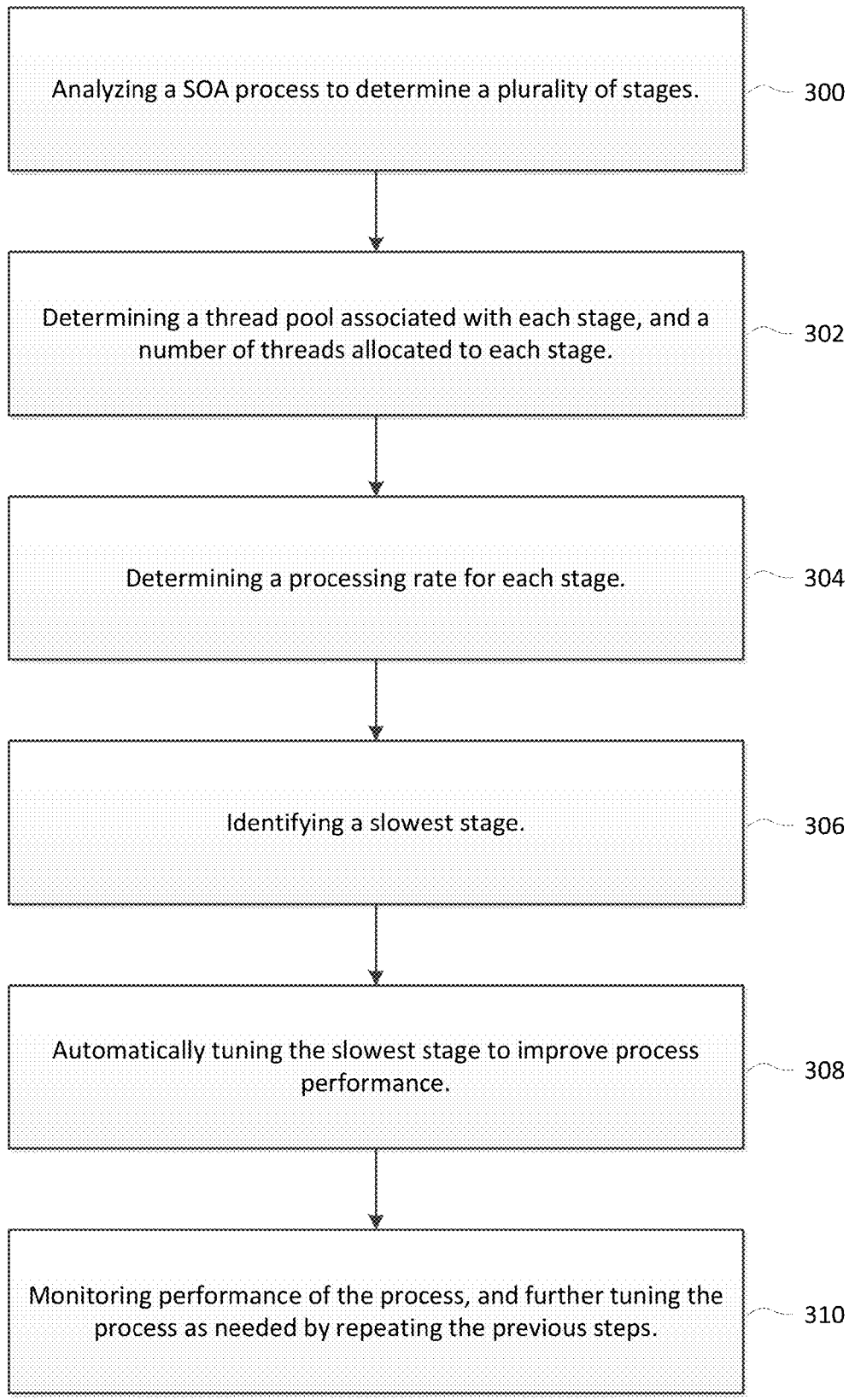
FIG. 3 shows a method of automatic performance tuning of a SOA process, in accordance with an embodiment of the present invention.

FIG. 3 shows a method of automatic performance tuning of a SOA process, in accordance with an embodiment of the present invention. At step 300, a SOA process is analyzed to determine a plurality of processing stages. For example, each stage may represent a different service utilized in the process, or any other distinct processing element within the process which utilizes threads in a thread pool. At step 302, a thread pool associated with each stage, and a number of threads allocated to each stage, is determined. As described above with respect to FIG. 2, a thread pool can be associated with one or more stages within a SOA process. By determining the associations between each stage and each thread pool, the automatic tuning module can determine how many threads are allocated to each stage, based on the maximum threads allocated to each thread pool. At step 304, a processing rate for each stage is determined. For example, an SOA monitor can be used to provide audit reports of messages through the SOA process. How long each stage takes to process a particular message can be extracted from the audit report. The processing time information from the audit report, and the number of threads determined previously, can be used to calculate a processing rate for each stage as described above with respect to FIG. 2. At step 306, a slowest stage is identified. At step 308, the slowest stage is automatically tuned to improve process performance. In accordance with an embodiment, tuning can comprise calculating a new number of threads to be allocated to the slowest processing stage, and allocating the new number of threads to the slowest processing stage. At step 310, monitoring of the process continues, and the process is further tuned as needed by repeating the previous steps. By continuing to monitor and adjust, the performance of the process can be automatically improved and stabilized in view of changing conditions. As discussed above, a pause time, or cool-off period, can be set to prevent the automatic tuning module from making adjustments too quickly and destabilizing the process.

Figure 4:
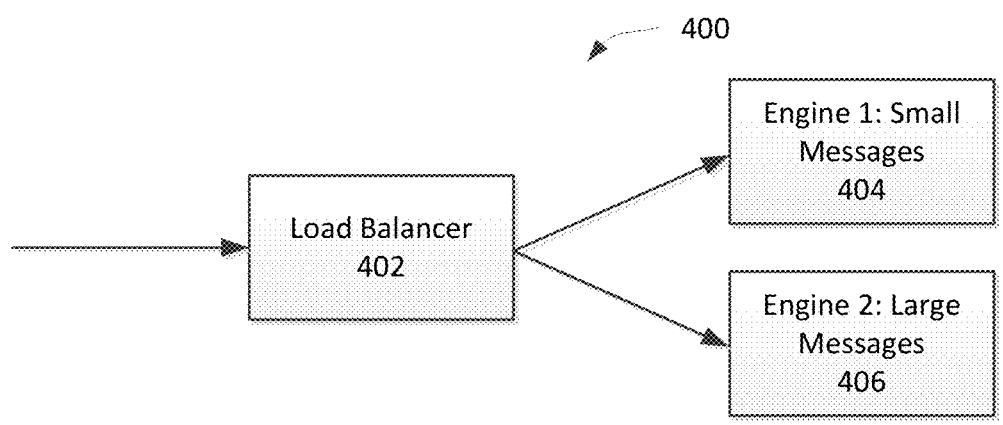
FIG. 4 shows an example of parallel processing, in accordance with an embodiment of the present invention.

FIG. 4 shows an example of parallel processing, in accordance with an embodiment of the present invention. As described above, the processing rate for a parallel process is determined by the fastest stage. One example of a parallel process is load balancing messages to different servers. As shown in FIG. 4, a process 400 can include a load balancer 402 which can separate large and small messages, and forward them to different engines for processing, such as engine 1 404 for small messages and engine 2 406 for large messages. The processing rate ($R_{parallel}$) for process 400 can be represented as the number of small messages ($N_{small}$) plus the number of large messages ($N_{large}$) which can be processed in a given time period:

$$R_{parallel}=(N_{small}+N_{large})/\text{time}$$

Assuming that processing of small messages is 100 times faster than larger messages, where N is an arbitrary number of messages, overall processing rate will be:

$$R_{parallel}=(100N+N)/\text{time}=101N/\text{time}$$

Tuning engine 2 406 to improve the processing of large messages will have a negligible effect on overall rate. For example, if a 10% improvement in the processing of large messages can be achieved by tuning engine 2 406, the tuned processing rate ($R_{tuned}$) process 400 will change minimally, i.e.:

$$R_{tuned}=(100+1.1)/\text{time}=101.1/\text{time which approximately equals 101.}$$

Accordingly, tuning in a parallel process can be more usefully directed to the fastest processing stage. Additionally, by separating processing of large and small messages, the system reduces the chance that processing large messages may clog all available threads and not leave threads available to process small messages.

Figure 5:
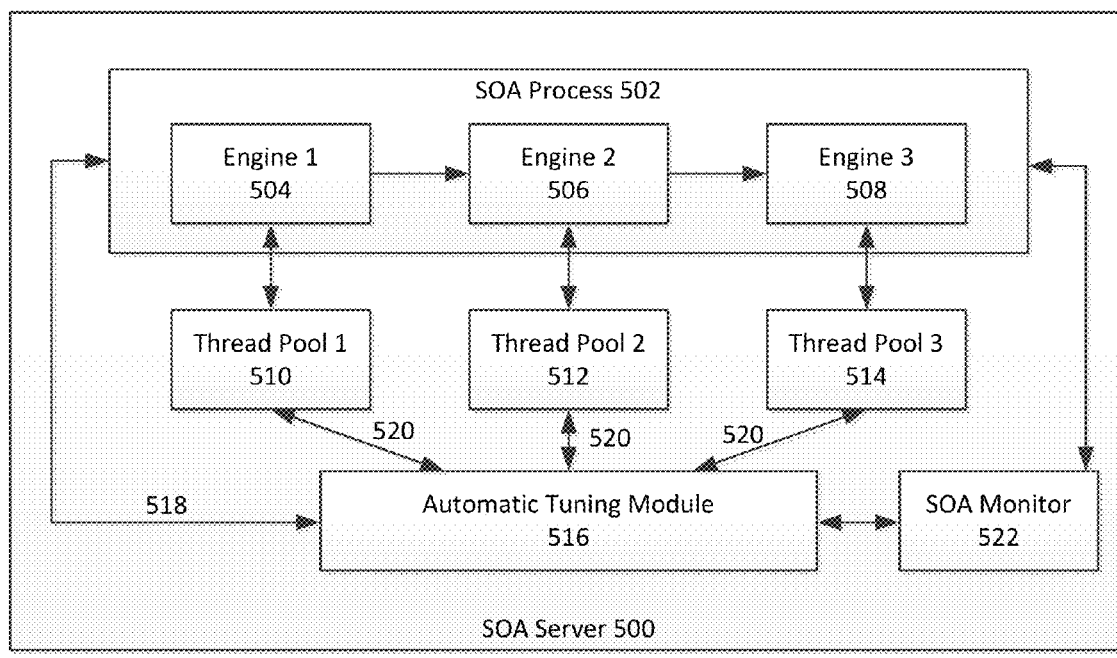
FIG. 5 shows a system for automatic performance tuning of a SOA process, in accordance with an embodiment of the present invention.

FIG. 5 shows a system for automatic performance tuning of a SOA process, in accordance with an embodiment of the present invention. As shown in FIG. 5, a SOA server 500 can be a cluster of one or more hardware and/or software servers. The SOA server 500 can execute SOA software, such as SOA Suite available from Oracle Corporation, which can enable SOA processes to be created and deployed. Each SOA process, such as SOA process 502, can be comprised of a plurality of distinct processing stages, such as engines 504-508.

Each stage can be associated with a thread pool, which allocates threads for each stage to use during execution to process messages. For example, Engine 1 504 is associated with thread pool 1 510, Engine 2 506 is associated with thread pool 2 512, and Engine 3 508 is associated with thread pool 3 514.

As described above, each thread pool can have a maximum number of threads. This maximum can be adjusted depending on system resources and process needs. Typically, monitoring processes and adjusting thread pools are adjusted manually. However, automatic tuning module 516, executing on the SOA server, can monitor 518 each process and tune 520 the thread pools automatically. In monitoring each process, the automatic tuning module 516 can identify each stage in a process and its associated thread pool, and determine how many threads are allocated to each stage. As described above, the automatic tuning module can determine how long each stage takes to process a message using a SOA monitor 522 which generates audit reports. The automatic tuning module 516 can then calculate a processing rate for each stage, determine a slowest stage, and automatically tune the thread pool associated with that stage accordingly.

Figure 6:
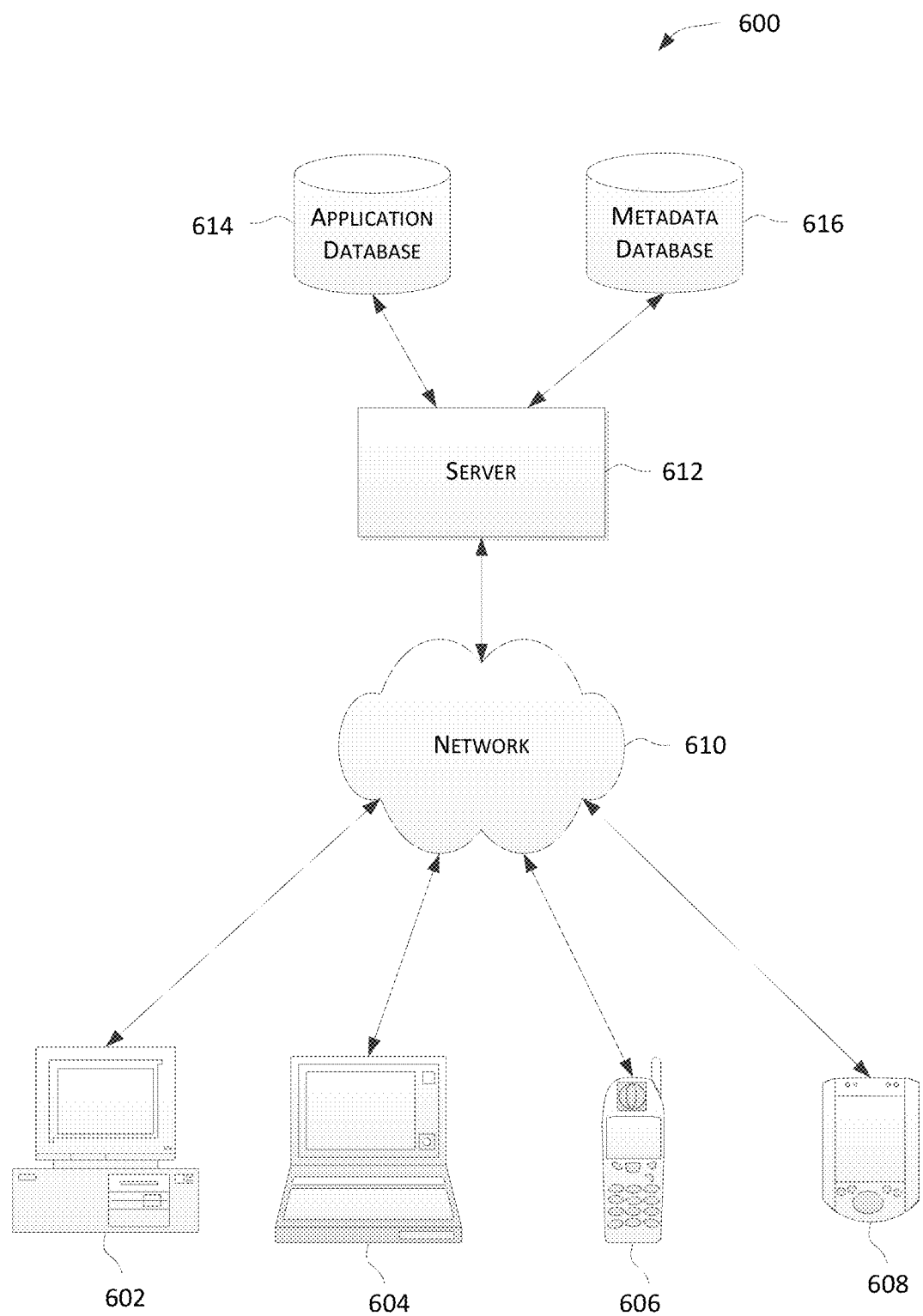
FIG. 6 is a simplified block diagram illustrating components of a system environment that may be used in accordance with some embodiments of the present invention.

FIG. 6 is a simplified block diagram illustrating components of a system environment 600 that may be used in accordance with some embodiments of the present invention. As shown, system environment 600 includes one or more client computing devices 602, 604, 606, 608, which are configured to operate a client application such as a web browser, proprietary client (e.g., Oracle™ Forms), or the like. In various embodiments, client computing devices 602, 604, 606, and 608 may interact with a server 612.

Client computing devices 602, 604, 606, 608 may be general purpose personal computers (including, by way of example, personal computers and/or laptop computers running various versions of Microsoft Windows™ and/or Apple Macintosh™ operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 602, 604, 606, and 608 may be any other electronic device, such as a thin-client computer, Internet-enabled gaming system, and/or personal messaging device, capable of communicating over a network (e.g., network 610 described below). Although system environment 600 is shown with four client computing devices, any number of client computing devices may be supported. Other devices such as devices with sensors, etc. may interact with server 612. Authorization requests may be received from one or more client devices.

System environment 600 may include a network 610. Network 610 may be any type of network familiar to those skilled in the art that can support data communications using any of a variety of commercially-available protocols, including without limitation TCP/IP, SNA, IPX, AppleTalk, and the like. Merely by way of example, network 610 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/or any other wireless protocol); and/or any combination of these and/or other networks.

System environment 600 also includes one or more server computers 612 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure.

Server 612 may run an operating system including any of those discussed above, as well as any commercially available server operating system. Server 612 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 600 may also include one or more databases 614, 616. Databases 614, 616 may reside in a variety of locations. By way of example, one or more of databases 614, 616 may reside on a storage medium local to (and/or resident in) server 612. Alternatively, databases 614, 616 may be remote from server 612, and in communication with server 612 via a network-based or dedicated connection. In one set of embodiments, databases 614, 616 may reside in a storage-area network (SAN) familiar to those skilled in the art. Similarly, any necessary files for performing the functions attributed to server 612 may be stored locally on server 612 and/or remotely, as appropriate. In one set of embodiments, databases 614, 616 may include relational databases, such as Oracle 10g, 11g, Release 12, etc., which are adapted to store, update, and retrieve data in response to SQL-formatted and other commands. In one embodiment, policies configured to controlling a set of resources may be stored by one of the databases.

Figure 7:
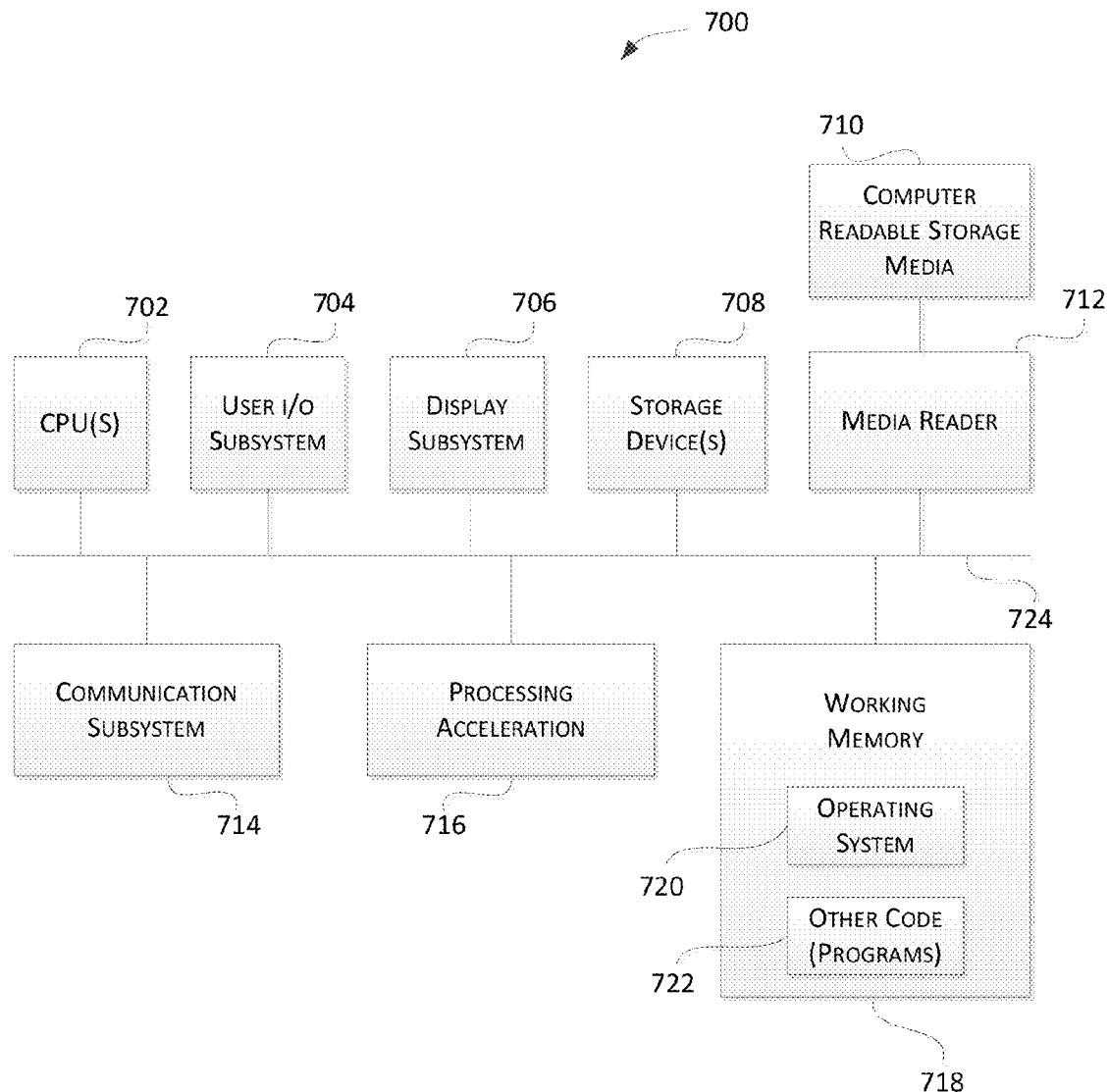
FIG. 7 is a simplified block diagram of a computing system that may be used in accordance with embodiments of the present invention.

FIG. 7 is a simplified block diagram of a computing system 700 that may be used in accordance with embodiments of the present invention. Computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The CPUs may include single or multicore CPUs. Computer system 700 may also include one or more storage devices 708. By way of example, the storage device(s) 708 may include devices such as disk drives, optical storage devices, and solid-state storage devices such as a random access memory (RAM) and/or a read-only memory (ROM), which can be programmable, flash-updateable and/or the like.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, and/or the like.

Computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 may permit data to be exchanged with network 710 and/or any other computer described above with respect to system environment 700.

Computer system 700 may also comprise software elements, shown as being currently located within working memory 718, including an operating system 720 and/or other code 722, such as an application program (which may be a client application, Web browser, mid-tier application, RDBMS, etc.). In an exemplary embodiment, working memory 718 may include executable code and associated data structures such as memory structures used for processing authorization requests described above. It should be appreciated that alternative embodiments of computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, CD-ROM, digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method of performance tuning processing stages in a computer system, the method comprising:
   monitoring a plurality of processing stages to determine a thread rate for each processing stage and a number of threads enabled for each processing stage, wherein the thread rate is a number of messages which can be processed by a thread in a specified time period;
   calculating a processing speed for each of the processing stages by multiplying the thread rate by the number of threads enabled for each processing stage;
   tuning a slowest processing stage of the plurality of processing stages, wherein tuning comprises
      calculating a new number of threads to be allocated to the slowest processing stage;
      dividing the processing speed for a fastest processing stage by the thread rate for the slowest processing stage; and
      allocating the new number of threads to the slowest processing stage; and
   processing messages by the slowest processing stage utilizing the allocated threads.

2. The method of claim 1 further comprising:
   monitoring a plurality of queues, wherein each queue is associated with a different processing stage and includes messages to be processed; and
   if a particular queue includes a number of messages greater than a threshold, then
      reducing a number of threads allocated to a first processing stage in the plurality of processing stages, and
      increasing a number of threads allocated to a particular processing stage associated with the particular queue.

3. The method of claim 1 further comprising:
   analyzing a service oriented architecture (SOA) process to identify the plurality of processing stages.

4. The method of claim 1, wherein each processing stage is associated with a thread pool.

5. The method of claim 4, wherein each thread pool is associated with a maximum number of threads, and wherein the number of threads allocated from each thread pool is less than or equal to the number of threads enabled for that thread pool's associated processing stage.

6. The method of claim 1, further comprising:
   generating an audit report including the processing speed calculated for each processing stage of the plurality of processing stages.

7. The method of claim 6, wherein monitoring a plurality of processing stages to determine a thread rate for each processing stage further comprises:
   determining the thread rate based on the audit report.

8. A system for performance tuning processing stages, comprising:
   a computer, including a computer readable medium and processor;
   a process, executing on the computer, wherein the process comprises a plurality of processing stages;
   an automatic tuning module, wherein the automatic tuning module is operable to
      monitor the plurality of processing stages to determine a thread rate for each processing stage and a number of threads enabled for each processing stage, wherein the thread rate is a number of messages which can be processed by a thread in a specified time period;
      calculate a processing speed for each of the processing stages by multiplying the thread rate by the number of threads enabled for each processing stage;
      automatically tune a slowest processing stage of the plurality of processing stages, wherein tuning comprises
         calculating a new number of threads to be allocated to the slowest processing stage;

dividing the processing speed for a fastest processing stage by the thread rate for the slowest processing stage; and allocating the new number of threads to the slowest processing stage; and processing messages by the slowest processing stage utilizing the allocated threads.

9. The system of claim 8 wherein the automatic tuning module is further operable to:

monitor a plurality of queues, wherein each queue is associated with a different processing stage and includes messages to be processed; and if a particular queue includes a number of messages greater than a threshold, then reduce a number of threads allocated to a first processing stage in the plurality of processing stages, and increase a number of threads allocated to a particular processing stage associated with the particular queue.

10. The system of claim 8 wherein the automatic tuning module is further operable to:

analyze a service oriented architecture (SOA) process to identify the plurality of processing stages.

11. The system of claim 8, wherein each processing stage is associated with a thread pool.

12. The system of claim 11, wherein each thread pool is associated with a maximum number of threads, and wherein the number of threads allocated from each thread pool is less than or equal to the number of threads enabled for that thread pool's associated processing stage.

13. The system of claim 8, further comprising:

generating an audit report including the processing speed calculated for each processing stage of the plurality of processing stages.

14. The system of claim 13, wherein monitoring a plurality of processing stages to determine a thread rate for each processing stage further comprises:

determining the thread rate based on the audit report.

15. A non-transitory computer readable storage medium including instructions stored thereon which, when executed by a processor, cause the processor to perform the steps of:

monitoring a plurality of processing stages to determine a thread rate for each processing stage and a number of threads enabled for each processing stage, wherein the thread rate is a number of messages which can be processed by a thread in a specified time period;

calculating a processing speed for each of the processing stages by multiplying the thread rate by the number of threads enabled for each processing stage;

tuning a slowest processing stage of the plurality of processing stages, wherein tuning comprises calculating a new number of threads to be allocated to the slowest processing stage;

dividing the processing speed for a fastest processing stage by the thread rate for the slowest processing stage; and allocating the new number of threads to the slowest processing stage; and processing messages by the slowest processing stage utilizing the allocated threads.

16. The non-transitory computer readable storage medium of claim 15 further comprising:

monitoring a plurality of queues, wherein each queue is associated with a different processing stage and includes messages to be processed; and if a particular queue includes a number of messages greater than a threshold, then reducing a number of threads allocated to a first processing stage in the plurality of processing stages, and increasing a number of threads allocated to a particular processing stage associated with the particular queue.

17. The non-transitory computer readable storage medium of claim 15, wherein each processing stage is associated with a thread pool.

18. The non-transitory computer readable storage medium of claim 17, wherein each thread pool is associated with a maximum number of threads, and wherein the number of threads allocated from each thread pool is less than or equal to the number of threads enabled for that thread pool's associated processing stage.

19. The non-transitory computer readable storage medium of claim 15, further comprising:

generating an audit report including the processing speed calculated for each processing stage of the plurality of processing stages.

20. The non-transitory computer readable storage medium of claim 19, wherein monitoring a plurality of processing stages to determine a thread rate for each processing stage further comprises:

determining the thread rate based on the audit report.

\* \* \* \* \*

UNITED STATES PATENT AND TRADEMARK OFFICE
CERTIFICATE OF CORRECTION

| | |
|---|---|
| PATENT NO. | : 9,092,270 B2 |
| APPLICATION NO. | : 13/626818 |
| DATED | : July 28, 2015 |
| INVENTOR(S) | : Stern et al. |

It is certified that error appears in the above-identified patent and that said Letters Patent is hereby corrected as shown below:

In the specification,

In column 2, line 7, delete "invention;" and insert -- invention. --, therefor.

Signed and Sealed this
Twenty-fourth Day of May, 2016

Michelle K. Lee
*Director of the United States Patent and Trademark Office*